July 8, 1969            C. H. ANDERSON            3,454,885
INCOHERENT BROADBAND CIRCULARLY POLARIZED MASER OPTICAL PUMPING
Filed April 26, 1965
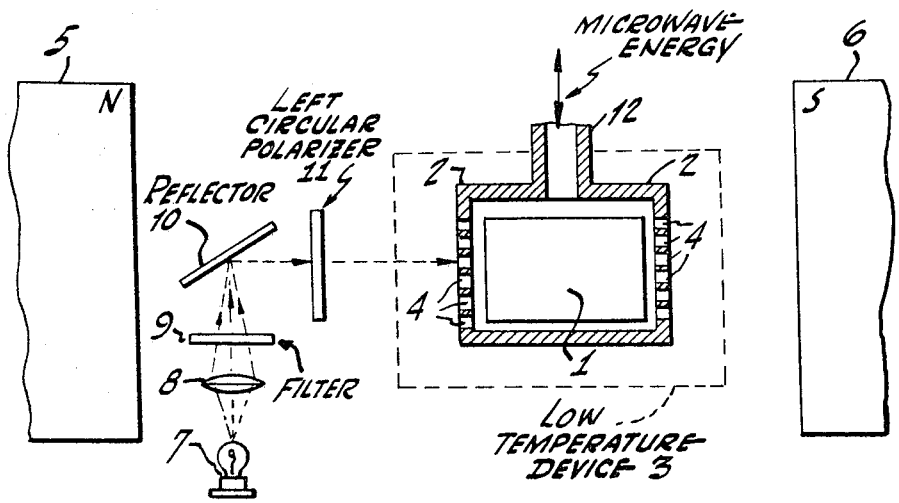
INVENTOR.
CHARLES H. ANDERSON
BY
Edward J. Norton
Attorney United States Patent Office 3,454,885
Patented July 8, 1969

3,454,885
INCOHERENT BROADBAND CIRCULARLY POLARIZED MASER OPTICAL PUMPING
Charles H. Anderson, Rocky Hill, N.J., assignor to Radio Corporation of America, a corporation of Delaware
Filed Apr. 26, 1965, Ser. No. 450,940
Int. Cl. H01s 1/00
U.S. Cl. 330—4          6 Claims

ABSTRACT OF THE DISCLOSURE

There is disclosed a device for directly pumping a maser with light from a broadband noncoherent optical source. This is accomplished by utilizing a crystal, such as divalent thulium doped calcium fluoride, which has a ground energy level which may be split by a Zeeman magnetic field and which also has a broadband spectra whose energy levels differ from the ground level by a broadband of optical frequencies. By pumping such a crystal with broadband noncoherent light which is circularly polarized in the proper direction, the number of transitions from the lower Zeeman level to the broadband spectra will exceed the number of transitions from the upper Zeeman level to the broadband spectra by a sufficient amount to produce a population inversion between the upper and lower Zeeman levels.

---

This invention relates to optical pumping and particularly to a novel optical pumping system for a maser.

Generally speaking optical pumping is well known to the maser art. An example of optical pumping is embodied in the maser system suggested by Dicke in U.S. Patent 2,884,524. In the conventional optically pumped maser system, a population inversion between two magnetic sublevels of the ground state of a paramagnetic material is accomplished with light whose frequency corresponds to a particular absorption line of the paramagnetic material. For example, circularly polarized light corresponding to the D lines in sodium may be used to pump a sodium maser as suggested in the Dicke patent. Absorption of light in the prior art systems is by way of very narrow absorption lines, e.g. the sodium D lines. The narrowness of the absorption lines requires that the pumping source be matched very closely to the absorption line of the paramagnetic material. This results in a relatively limited tuning range for the maser because as the magnetic field of the maser is varied to vary the output frequency the frequency of the absorption line also changes. Furthermore, intense narrow emission line sources are required for efficient pumping.

It is therefore an object of the present invention to provide a novel optical pumping system for a maser.

It is a further object of the present invention to provide an optical pumping system in which a relatively broadband pumping source may be effectively used.

A further object of the present invention is to provide an optically pumped maser which is easily tunable.

It is a further object of the present invention to provide an optically pumped solid state maser.

The above objects are accomplished by utilizing suitable materials for the maser which have broad, optically active, absorption bands. The material is pumped from a source supplying energy at frequencies in the optically active bands of the maser material. A suitable material for use with the present invention is one where the spin-orbit interaction plays a dominent role over the crystal field in at least one of the electronic levels connected by the optical pumping radiation.

In one embodiment of the present invention a paramagnetic material having broad absorption bands and further having a ground state in which the spin-orbit interaction is dominent over the crystal field is placed in a magnetic field to split the ground state into its Zeeman sublevel components. A broadband pumping source having an emission spectrum corresponding to the absorption bands of the paramagnetic material supplies circularly polarized light which is passed along the axis of the magnetic field to the paramagnetic material. The circularly polarized light causes energy level transitions to occur selectively from the ground state due to the spin-orbit interaction. The selectivity is such that the energy level transitions caused by the circularly polarized light occur at a higher rate between the lower magnetic sublevel of the ground state and some broad optical absorption bands of the paramagnetic material than do transitions from the upper of the sublevels. The selective pumping then causes a population inversion between the sublevels of the ground state, and where the spin relaxation rate is lower than the pumping rate maser action results.

A more detailed description of the present invention will be given with reference to the accompanying drawing in which the single figure is a diagram, partly in section, of one embodiment of the invention.

Before describing an illustrative embodiment of the present invention, the principles of the invention will be described.

I have discovered that, over certain broad frequency bands, light of a suitable polarization and direction can be selectively absorbed by different energy levels of an impurity in a crystal. This selective absorption into broad bands is in contrast to conventional narrow line selective absorption in conventional optically pumped maser systems. The present invention utilizes this discovery to accomplish broadband incoherent optical pumping of masers. Crystal impurity sites in which such selective absorption is possible are those where the spin-orbit interaction dominates the crystal field in the energy levels involved in the absorption. A brief explanation of this effect will now be given.

The absorption bands associated with impurity sites in crystals are primarily due to electric dipole transitions to excited electronic levels. The electronic levels are broadened by the simultaneous excitation of many vibrational states associated with the upper electronic states. These vibrational levels are excited according to the Franck-Condon principle, which has the selection rule that the vibrational part does not change its symmetry during electronic transition. Therefore, the selection rules for these optical transitions are those of the electric dipole operator between the electronic levels. This is well known for free molecules and holds equally well for impurity sites in crystals so long as the broadening is not due to influence from the electronic bands of the crystals interacting solely with the impurity site.

The electric dipole operator, which is involved in the optical transitions, acts on the orbital part of the wave function of the impurity site but leaves the spin part alone. Therefore, in a case where the crystal field dominates the spin-orbit interaction to an extent such that the wave function is well described as a product of spin and orbital parts, the only selection rule on the spin quantum numbers is that they do not change. In this case the light cannot selectively pump one spin state over the other and no population inversion can be accomplished. However, where the spin-orbit interaction dominates the crystal field the spin part will then be influential in the transition and in general there will be different selection rules on different sublevels for different polarization and frequencies of light. For a general discussion of electronic spectra in crystals see McClure, Electronic Spectra of Molecules and Ions in Crystals, Academic Press—1959, Solid State Reprints.

The best examples of where the spin-orbit interaction dominates over the crystal field are the ground states of rare earth ions having a $4f^n$ configuration in a suitable host, e.g. an alkaline earth halide. The first allowed electric dipole transitions for these ions are to the $4f^{n-1}5d$ configuration where the two interactions, crystal field and spin-orbit, can be equally strong. In either case, the various levels of this configuration can always be described in terms of the irreducible representation of the local symmetry. And if one region of the bands is primarily of one character, i.e. one irreducible representation, there will be definite selection rules for the absorption of circularly polarized light which will differ for the various magnetic sublevels of the ground state.

The figure shows a maser system constructed according to the principles of the present invention. A suitable crystal 1 is placed within a microwave resonant cavity 2 which is resonant at the desired frequency. By way of example the cavity 2 can be constructed of metal and dimensioned to support energy at 10 kmc. (kilomegacycles). A suitable crystals 1 for use in the present maser is divalent thulium in calcium fluoride in a molar concentration of about .02 percent thulium. The cavity 2, which contains the crystal 1, is situated in a low temperature device 3, which may for example be a conventional Dewar flask, to maintain the crystal at the proper temperature. A pumped liquid helium bath will provide sufficient cooling at about 1.5 degrees Kelvin. The cavity 2 and crystal 1 are placed between north and south poles 5 and 6 of a magnet. The strength of the magnetic field will depend upon the particular microwave frequency desired. For a 10 kmc. microwave frequency the magnetic field in the region of a crystal can be, for example, approximately 2,000 gauss.

A xenon-mercury lamp 7 supplies pumping energy to the crystal 1. The optical energy from the lamp 7 is supplied through a conventional lens system 8 and through a broadband optical filter 9 to a reflector 10 which directs the light along the axis of the magnetic field and through the low temperature device 3 and the cavity 2. The low temperature device 3 is constructed to permit maximum transmission of light. A suitable glass construction may be used. A plurality of slits 4 are positioned in the walls of the cavity 2 to permit the light to pass through the cavity and the crystal. The filter 9 removes any undesired components, e.g. infra-red frequencies and frequencies which are not selectively absorbed. A left circular polarizer 11 is positioned between the reflector 9 and the crystal 1. The power output of the lamp 7 can be such that the flux density of the light at the crystal 1 is, for example, approximately 3 watts per square centimeter. This can generally be accomplished by using a lamp of approximately 2,500 watts. The length of the crystals 1 in the direction of the optical pumping energy can be, for example approximately ½ to 1 centimeter.

In the operation of the maser the magnetic field established in the region of the crystal 1 causes the ground state of the divalent thulium in the crystal 1 to split into its Zeeman sublevel components. The energy difference between the Zeeman components for the value of the field given above corresponds approximately to 10 kmc. The character of the lower Zeeman level will be $E_{-5/2}$ while that of the upper Zeeman level will be $E_{+5/2}$. The xenon-mercury lamp 7 supplies optical energy along the axis of the magnetic field. The filtered light from the lamp 7 is included within the absorption spectrum of the thulium in the crystal 1 and therefore most of this light is absorbed.

The strong absorption bands of the thulium which are in the visible frequency range are predominently of G character. The existence of strong absorption bands of G character results in most of the left circular polarized light being absorbed by the lower, $E_{-5/2}$ character, sublevel. Experiments have shown that the pumping rate of the $E_{-5/2}$ character band is about three times that of the $E_{+5/2}$ character band. Therefore, a population inversion will result and any microwave energy supplied to the cavity 2 via a waveguide or other suitable structure 12 of a frequency corresponding to the energy difference between the sublevels will be amplified.

While the present invention has been described with reference to divalent thulium in calcium fluoride, it should be noted that many other materials may be used. In general a suitable material for use in a maser where the ground state is split into Zeeman components will have the characteristic that the spin-orbit interaction plays a dominent role over the crystal field in at least one of the electronic energy levels connected by the optical pumping radiation. Furthermore it should be noted that there is not necessarily a requirement that a magnetic field be used with a resulting split into Zeeman components. In many materials there are several crystal field levels close to the ground state. When such a material is used the characteristics of the light used to pump the material will not necessarily be the same as those in the above described embodiment. The frequency of the light used to pump such a material will be such that the selection rule for optical transitions will permit transitions from the lower of two energy levels to occur at a higher rate than transitions from the upper of the two.

What is claimed is:

1. A maser featuring a broadband optical pumping comprising a given paramagnetic crystal within a predetermined magnetic environment, said crustal being located within a resonant cavity tuned to a predetermined frequency, wherein said crystal when within said predetermined magnetic environment is characterized by first, second and third absorption spectra, said first and second spectra each being a narrow line with the energy level of said second line exceeding that of said first line by an amount substantially equal to said predetermined frequency times Planck's constant, said third spectra being a broadband whose energy levels exceed those of said first and second spectra, respectively, by a broadband of optical frequencies times Planck's constant, said crystal when within said predetermined magnetic environment exhibiting a dichroism to light of said optical frequencies circularly polarized in a given direction being applied thereto such that energy level transitions from said first spectra to said third spectra exceed energy level transitions from said second spectra to said third spectra, whereby a population inversion of said second spectra with respect to said first spectra occurs in response to a sufficient amount of said light being applied to said crystal, and a noncoherent broadband light source for directly applying said sufficient amount of said light to said crystal to effect the pumping of said maser.

2. The maser defined in claim 1 wherein said predetermined frequency is a microwave frequency.

3. The maser defined in claim 1, further including means for applying a predetermined magnetic field to provide said magnetic environment, said first and second spectra being the lower and upper Zeeman components produced by said magnetic field.

4. The maser defined in claim 3, wherein said first and second spectra are the Zeeman components of the ground level of the crystal.

5. The maser defined in claim 3, wherein said magnetic field is parallel to the direction of travel of said light through said crystal.

6. The maser defined in claim 1, wherein said crystal is divalent thulium doped calcium fluoride.

References Cited

UNITED STATES PATENTS 3,343,102  9/1967  Scovil _____ 330—4

FOREIGN PATENTS 1,258,072  2/1961  France.
1,262,309  4/1961  France.

JOHN KOMINSKI, *Primary Examiner.*

DARWIN R. HOSTETTER, *Assistant Examiner.*

U.S. Cl. X.R.

330—56; 331—94